United States Patent [19]

Kobayashi et al.

[11] Patent Number: 4,792,930

[45] Date of Patent: Dec. 20, 1988

[54] ACOUSTOOPTIC DEVICE CAPABLE OF INTERNALLY COOLING AN ACOUSTOOPTIC ELEMENT

[75] Inventors: Norio Kobayashi; Satoru Amano, both of Yamanashi, Japan

[73] Assignee: Hoya Corporation, Tokyo, Japan

[21] Appl. No.: 55,565

[22] Filed: May 29, 1987

[51] Int. Cl.⁴ .................................................. G02F 1/11
[52] U.S. Cl. ...................................... 367/140; 350/358; 372/13; 372/35
[58] Field of Search .................. 350/356, 358; 372/12, 372/13, 35; 367/140

[56] References Cited

U.S. PATENT DOCUMENTS

| | | | |
|---|---|---|---|
| 3,399,013 | 8/1968 | Aas et al. | 350/358 |
| 3,675,022 | 7/1972 | Nelson et al. | 350/356 |
| 4,119,929 | 10/1978 | Shackleford et al. | 350/356 |
| 4,229,079 | 10/1980 | Wayne et al. | 372/13 |
| 4,669,085 | 5/1987 | Plourde et al. | 372/12 |

OTHER PUBLICATIONS

"Performance Limits of Acoustooptic Light Deflectors due to Thermal Effects", by Hans Eschler, Appl. Physics, 1976.

Primary Examiner—Charles T. Jordan
Assistant Examiner—John W. Eldred
Attorney, Agent, or Firm—Roberts, Spiecens & Cohen

[57] ABSTRACT

In an acoustooptic device for use in acoustooptically controlling a laser beam in response to an electric signal, an acoustooptic element is packaged in a housing which defines an internal space therein and which can circulate a coolant in the internal space through inlet and outlet portions to directly cool the acoustooptic element by the coolant. The housing comprises a case block providing the internal space and a pair of cap members which forms windows for the laser beam, respectively, and which is hermetically attached to the case block with a pair of seal members interposed between the case block and each of the cap members. Each seal member comprises a first O-ring placed around the window and a second O-ring placed outside of the first O-ring to hermetically seal the internal space. The acoustooptic element may comprise an acoustooptic medium having a pair of surfaces for the laser beam and a side surface contiguous to the surface, a transducer mounted on the side surface, and an absorber opposite the transducer. The internal space may be divided into first and second internal spaces.

11 Claims, 5 Drawing Sheets

1

ACOUSTOOPTIC DEVICE CAPABLE OF INTERNALLY COOLING AN ACOUSTOOPTIC ELEMENT

BACKGROUND OF THE INVENTION

This invention relates to an acoustooptic device for use in controlling a laser beam to deflect or modulate the same in the device.

As will later be described with reference to a few figures of the accompanying drawing, a conventional acoustooptic device of the type described comprises an acoustooptic medium of, for example, a fused quartz and a transducer of, for example, a single crystal of lithium niobate attached to the acoustooptic medium. A combination of the acoustooptic medium and the transducer will be called an acoustooptic element hereinafter. With this structure, the transducer is supplied with an electrical signal or electric power to transform the electric signal into an ultrasonic wave which is propagated into the acoustooptic medium. Under the circumstances, an incident laser beam is incident onto the acoustooptic medium through an incident surface and is controlled by the ultrasonic wave to be emitted from the acoustooptic medium in the form of a diffracted beam or beams. For brevity of description, consideration will be made only about a first-order diffracted beam which is most important for such an acoustooptic device, although specific explanation will not be described.

In general, an acoustooptic device is evaluated by a diffraction efficiency which is given by the ratio of intensity between the incident and the diffracted laser beams. The diffraction efficiency is increased with an increase of the electric power supplied to the transducer.

Herein, it is to be noted that the electric power is finally converted in the acoustooptic medium into heat due to absorption of the ultrasonic wave of the acoustooptic medium and due to free vibration of the transducer. Consequently, the acoustooptic medium is heated to a temperature such that the acoustooptic medium is broken or destroyed.

In order to protect the acoustooptic medium from such destruction or breakage, a heat sink is usually attached to the acoustooptic element. More particularly, the heat sink has a cooling path formed therein and is brought into contact with the acoustooptic medium. A coolant, such as water, flows through the cooling path to cool the acoustooptic medium. In this situation, the acoustooptic medium is not kept in direct contact with the coolant and is, therefore, indirectly cooled by the coolant through the heat sink. Consequently, the cooling or cold efficiency is not particularly good and the acoustooptic medium therefore can not be kept at a low temperature. As a result, restriction is imposed on the electric power supplied to the acoustooptic medium which makes it difficult to obtain a high diffraction efficiency.

SUMMARY OF THE INVENTION

It is an object of this invention to provide an acoustooptic device which can be effectively cooled by a coolant.

It is another object of this invention to provide an acoustooptic device of the type described, which can establish a high diffraction efficiency.

It is still another object of this invention to provide an acoustooptic device of the type described, which can avoid breakage of the acoustooptic medium even when high electric power is supplied to the acoustooptic medium.

According to this invention, an acoustooptic device comprises an acoustooptic medium having first and second surfaces for receiving and emitting a laser beam, respectively, and a side surface contiguous to the first and the second surfaces, and a transducer attached to the side surface for transducing an electric signal into an acoustic or ultrasonic signal. The acoustooptic medium forms an acoustooptic element in combination with the transducer. The acoustooptic device further comprises a housing which defines an internal space therein and a pair of windows opposite each other for hermetically housing the acoustooptic element in the internal space with a part of the internal space left unoccupied by the acoustooptic element and with the parallel surfaces of the acoustooptic medium partially illuminable by the laser beam through the windows. An inlet portion is attached to the housing for introducing a coolant into the part of the internal space. An outlet portion is also attached to the housing for exhausting the coolant from the part of the internal space.

DESCRIPTION OF THE PREFERRED EMBODIMENT

Figure 1:
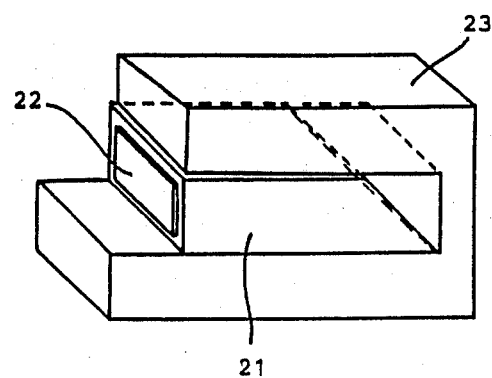
FIG. 1 is a perspective view of a conventional acoustooptic device.
Figure 2:
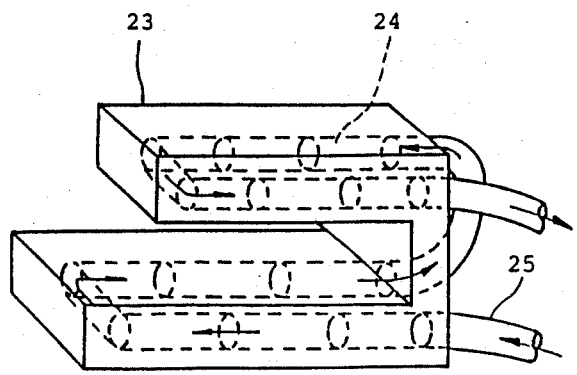
FIG. 2 is a similar view for use in describing a portion of the acoustooptic device illustrated in FIG. 1 in detail.

Referring to FIGS. 1 and 2, description will be made about a conventional acoustooptic device for a better understanding of this invention. The illustrated acoustooptic device acts as a Q-switched device and comprises an acoustooptic medium 21 of a rectangular parallelepiped shape having front and back surfaces, right-hand and left-hand side surfaces, and upper and lower surfaces. The front and the back surfaces may be called first and second surfaces. A transducer 22 is mounted on the left-hand side surface to form an acoustooptic element and is connected through a conductor (not shown) to a coaxial connector (not shown also) for a high frequency. Supplied with electric power or an electric signal, the transducer 22 generates an acoustic or ultrasonic wave which is propagated into the acoustooptic medium 21 from the left-hand side surface of FIG. 1 towards the right-hand side surface.

A laser beam (not shown) is incident on either one of the front and the back surfaces as an incident laser beam and is emitted from the other surface as a diffracted or output laser beam. With this structure, the electric power is finally converted into heat which gives rise to a temperature rise of the acoustooptic medium 21 and which often results in breakage of the acoustooptic medium 21.

In order to suppress such temperature rise of the acoustooptic medium 21, a heat sink 23 of, for example, aluminum is attached to the acoustooptic element with the heat sink 23 kept in contact with the upper and the lower surfaces and the right-hand side surfaces of the acoustooptic medium 21.

As shown in FIG. 2, a cooling path 24 is formed in the heat sink 23. A coolant, such as water, is introduced into the cooling path 24 through a hose 25 and flows through the cooling path 24 into a discharge hose.

Thus, the acoustooptic medium 21 is indirectly cooled through the heat sink 23 by the coolant. Therefore, the illustrated acoustooptic device has disadvantages as pointed out in the background section of the instant specification.

Figure 3:
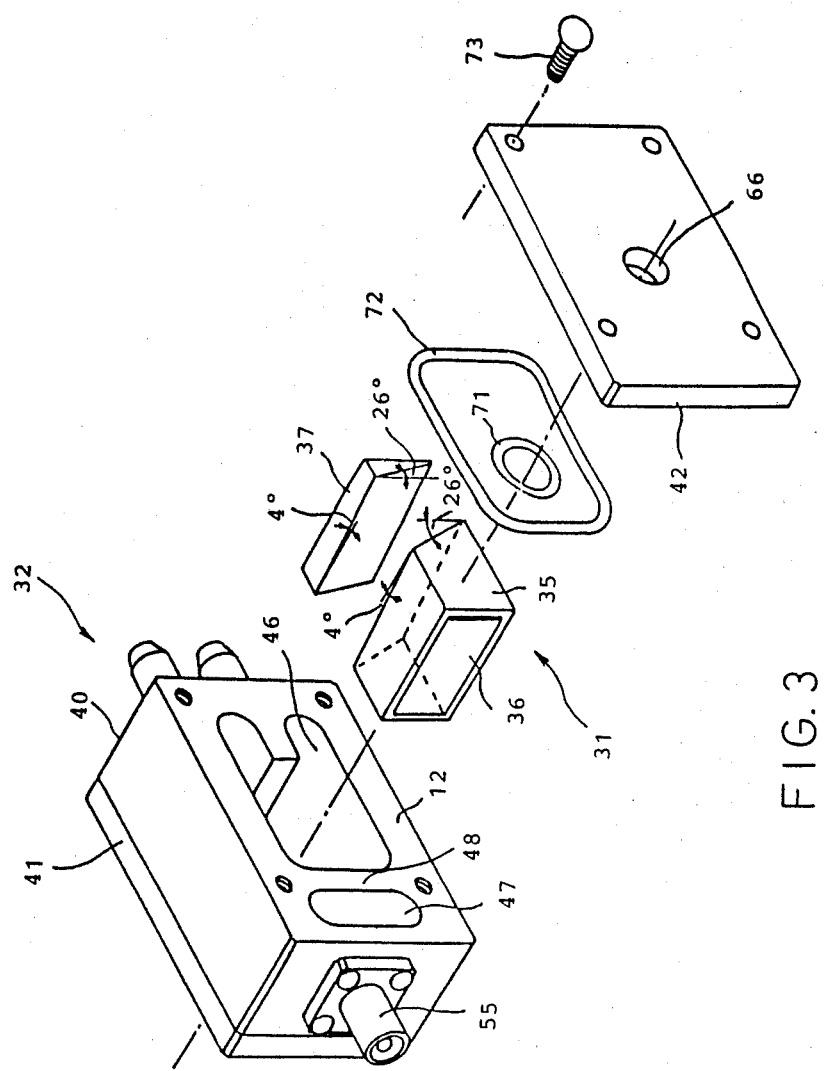
FIG. 3 is a exploded perspective view of an acoustooptic device according to a preferred embodiment of this invention.
Figure 4:
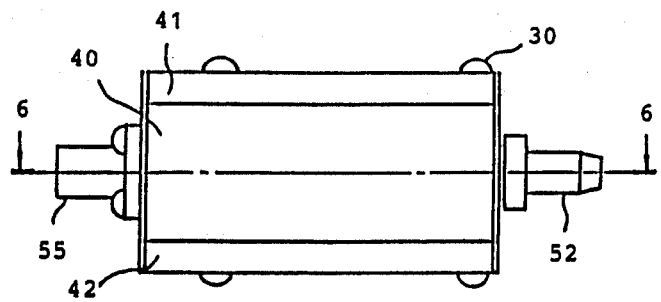
FIG. 4 is a top view of the acoustooptic device illustrated in FIG. 3.

Referring to FIGS. 3 and 4, an acoustooptic device according to a preferred embodiment of this invention comprises an acoustooptic element 31 (FIG. 3) and a housing 32 for hermetically housing the acoustooptic element 31. As shown in FIG. 3, the acoustooptic element 31 comprises an acoustooptic medium 35 of a fused quartz which has a configuration approximately of a rectangular parallelepiped which has a part cut away. The illustrated acoustooptic medium 35 has a size of 16 by 30 by 24 mm and upper and lower surfaces directed upwards and downwards of FIG. 3, front and back surfaces, and left-hand and right-hand side surfaces contiguous to the upper and the lower surfaces. As in FIG. 1, the front and the back surfaces may be called first and second surfaces, respectively. A transducer 36 comprises a piezoelectric plate of lithium niobate and an electrode member deposited and arranged on the piezoelectric plate. The illustrated transducer 36 is mounted on the left-hand side surface and confronted with the right-hand side surface. The left-hand side surface is rectangular and is defined by a pair of horizontal parallel lines and a pair of vertical parallel lines. The right-hand side surface is inclined at a first angle of 26° with the vertical parallel lines of the left-hand side surface and is also inclined at a second angle of 4° with the horizontal lines of the left-hand side surface.

On the right-hand side surface, an absorber 37 is attached to so that a combination of the acoustooptic medium 35 and the absorber 37 has a configuration of a rectangular parallelepiped. The absorber 37 is formed by a plate of aluminum which has an acoustic impedance substantially equal to the fused quartz. Such an absorber 37 serves to avoid reflection and return of the ultrasonic wave from the right-hand side surface.

The front and the back surfaces serve to receive an incident laser beam and emit an output laser beam subjected to diffraction.

Figure 5:
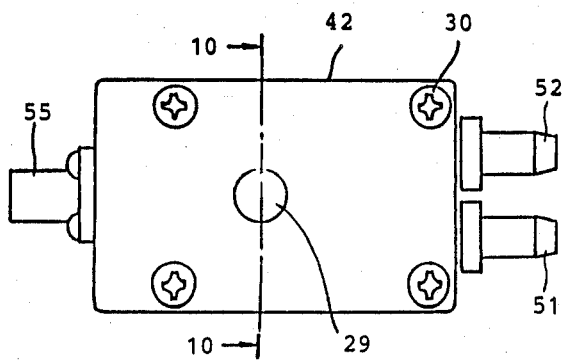
FIG. 5 is an elevational view of the acoustooptic device illustrated in FIG. 3.
Figure 6:
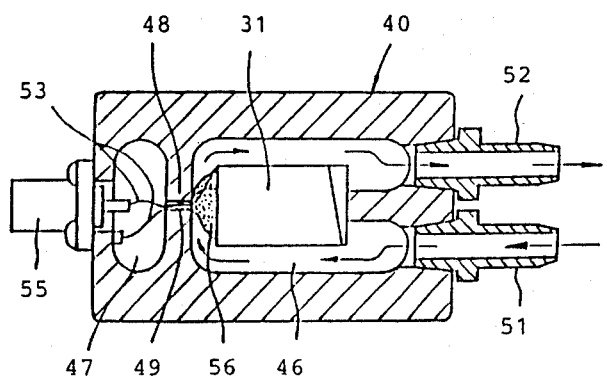
FIG. 6 is a sectional view taken along line 6—6 in FIG. 4.

Referring to FIG. 6 and FIGS. 3 through 5, the housing 32 comprises a case block 40 and first and second cap members 41 and 42 which are placed on both sides of the case block 40 and which are pressed against the case block 40. Therefore, the first and the second cap members 41 and 42 may be called presser plates. As illustrated in FIGS. 3 and 6, the case block 40 defines a first internal space 46 and a second internal space 47 with a partition or bulkhead 48 interposed between the first and the second internal spaces 46 and 47. In this connection, the case block 40 has front and back ends directed forwardly and backwardly of FIG. 6, respectively, and internal wall surfaces contiguous to the front and the back ends. Such internal wall surfaces serve to define the first and the second internal spaces 46 and 47 in the case block 40.

As shown in FIG. 6, an aperture 49 is opened in the partition 48 to electrically connect the transducer 36 to an external circuit through the second internal space 47 in a manner to be described later. The acoustooptic element 31 is housed in the first internal space 46 with a pair of the internal space left unoccupied by the acoustooptic element 31. A coolant, such as water, is introduced into the first internal space 46 and discharged from the first internal space 46 to directly cool the acoustooptic element 31. For this purpose, first and second hose connectors 51 and 52 are connected to the case block 40 on the right-hand side portion thereof. In the example being illustrated, the coolant is introduced through the first hose connector 51 into the first internal space 46, as shown by an arrow. Therefore, the first hose connector 51 may be called an inlet portion. On the other hand, the coolant is discharged through the second hose connector 52, as shown by another arrow, and may be called an outlet portion. Therefore, the coolant circulates through the first internal space 46 and directly cools the acoustooptic element 31 within the first internal space 46.

The transducer 36 (not shown in FIG. 6) must be electrically be connected to the external circuit. In addition, the transducer 36 is disposed within the first internal space 46 and might objectionably be wetted by the coolant.

Under the circumstances, lead conductors 53 are connected to the transducer 36 and extend from the transducer 36 through the aperture 49 and the second internal space 47 to a coaxial connector 55 which is to be connected to the external circuit. Moreover, the transducer 36 is covered with a seal material 56 of nonconductive silicone resin. The seal material 56 also covers the lead conductors 53 and is embedded into the aperture 49. Consequently, the second internal space 47 is tightly sealed from the first internal space 46 to prevent leakage of the coolant into the second internal space 47. In addition, such seal material serves to prevent erosion of the electrode member of the transducer 36 due to the coolant and to avoid disconnection of the lead conductors 53.

Figure 7:
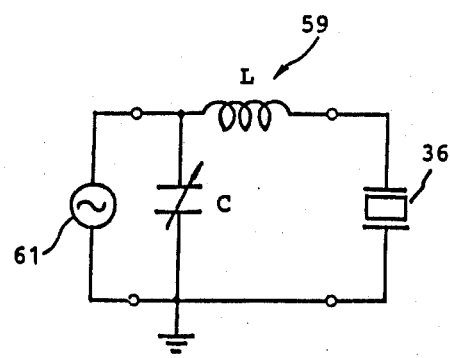
FIG. 7 is a circuit diagram of an impedance matching circuit for use in the acoustooptic device illustrated in FIG. 3.

Referring to FIG. 7 together with FIG. 6, the second internal space 47 serves for accommodating the impedance matching circuit 59 as shown in FIG. 7 and may therefore be referred to as the impedance matching space. Such an impedance matching circuit 59 may be located between the coaxial connector 55 and the lead conductors 53, although not explicitly illustrated in FIG. 6, and acts to match an impedance of the transducer 36 with an impedance (for example, 50 ohms) of a cable for transmitting the electric signal from a power source 61 (FIG. 7) of the external circuit to the acoustooptic device. The impedance matching circuit 59 serves to effectively supply the electric signal to the transducer 36 and comprises an inductance L and a variable capacitance C, as illustrated in FIG. 7.

Figure 8:
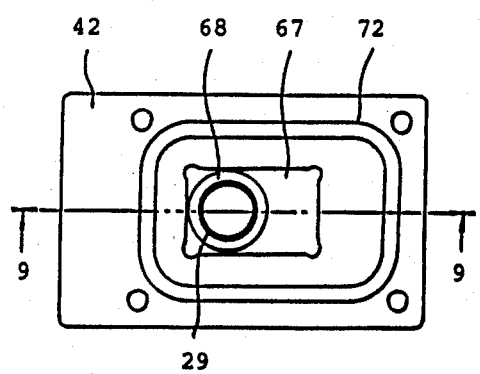
FIG. 8 is a plan view of a cap member used as a part of the acoustooptic device illustrated in FIG. 3.
Figure 9:
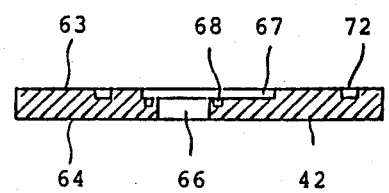
FIG. 9 is a sectional view taken along a line 9—9 in FIG. 8.
Figure 10:
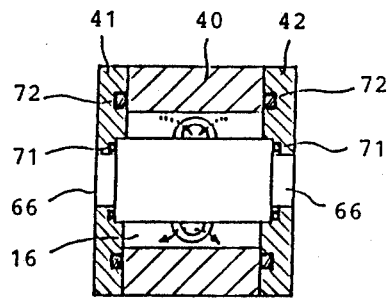
FIG. 10 is a sectional view taken along a line 10—10 in FIG. 5.

Referring to FIGS. 8 and 9 in addition to FIGS. 3 through 5, the case block 40 is interposed between the first and the second cap members 41 and 42 which are identical in structure with each other and which made of aluminum. In this connection, description will be restricted only to the second cap member 42. As shown in FIG. 8, the second cap member 42 has an inside surface 63 directed towards the first internal space 46 and an outside surface 64 directed outwards of the acoustic device. The second cap member 42 has a window 66 extended from the outside surface of the second cap member 42 as readily understood from FIG. 3. Such a window 66 is defined by a cap internal surface of the second cap member 42 and serves to receive or emit a laser beam which is used as either the incident or the output laser beam of the transducer 36. The window 66 is associated with a recessed portion 67 which is formed on the inside surface 63, as best shown in FIG. 9, and which is recessed relative to the inside surface 63. Such a recessed portion 67 serves for supporting the acoustooptic element 31 on either the front and back surfaces thereof. Therefore, the recessed portion 67 has a size mated with that of the acoustooptic element 31 and may be, for example, 25 millimeters long, 16 millimeters wide, and 2 millimeters deep, in the illustrated acoustooptic device. In the recessed portion 67, a circular groove 68 is formed around the window 66 for receiving a first O-ring of fluoric resin, as depicted at 71 in FIG. 3. Thus, the circular groove 68 provides a first receiving portion. The first O-ring 71 may have a thickness of 1.6 mm.

On the inside surface of the second cap member 42, the recessed portion 67 is surrounded by a second groove 72 in which a second O-ring 72 is fitted, as shown in FIG. 3. Thus, the second groove 72 is a second receiving portion. The second O-ring 72 may be of fluorocarbon resin and may have a thickness of 1.6 mm and a diameter of 11.1 mm. The second O-ring 72 serves to prevent leakage of the coolant from the first internal space 46. As shown in FIG. 3, the acoustooptic element 31 is housed or packaged within the case block 40 with the absorber 37 and the transducer 36 attached to the acoustooptic medium 35. Thereafter, the first and the second cap members 41 and 42 are fastened by four screws 73 threaded into holes formed in each of the cap members 41 and 42. Thus, the first and the second O-rings 71 and 72 are firmly interposed between the case block 40 and each cap member 41 and 42. In this event, the first O-ring 71 acts to prevent entry of the coolant into each window and also to fixedly position the acoustooptic medium 35 relative to the case block 40. As a result, the front and the back surfaces of the acoustooptic medium 35 is transverse to an optical axis of the laser beam.

In the acoustooptic device assembled in the above-mentioned manner, the windows 66 are hermetically or watertightly sealed by a pair of the first O-rings 71 and can receive or emit the laser beam. In other words, the acoustooptic medium 35 can partially be illuminated through the windows 66 by the laser beam. The first and the second cap members 41 and 42 are also hermetically sealed to the case block 40 by a pair of the second O-rings 72. Consequently, it is readily understood that the acoustooptic element 31 is immersed in the coolant except for those portions of the acoustooptic element 31 uncovered by the first and the second cap members 41 and 42. Such uncovered portions may be called incident and output portions for the laser beam. At any rate, the illustrated acoustooptic device may be, for example, 44 by 70 by 38 mm in size.

The acoustooptic device can be evaluated by actually applying a laser beam and an electric signal. Herein, a laser beam of a wavelength of 1.06 μm was produced by a solid-state laser of YAG (yttrium aluminum garnet) doped with Nd and was unpolarized. Under the circumstances, a transversal wave was caused to occur due to a torsional vibration in the transducer 36 formed by a single crystal of lithium niobate (LiNbO$_3$). In order to generate the torsional vibration, an X-cut plate of the single crystal was used which has a principal normal in the X-direction.

Taking into consideration a factor determined by a frequency of the electrical signal and a thickness of a plate, the X-cut plate in question has a factor equal to 2400 MHz. μm. This shows that the X-cut plate oscillates in a fundamental vibration mode when the X-cut plate of a thickness of 100 μm is driven by the electric signal of 24 MHz.

On the other hand, a characteristic of the acoustooptic device can be evaluated by the Bragg diffraction angle $\theta$ (may be called a separation angle) which is given by:

$$\theta = f\lambda/v,$$

where f represents the frequency of the electric signal; λ, the wavelength of the laser beam; and v, velocity of sound in the acoustooptic medium 35 of a fused quartz. The velocity v of sound in the fused quartz is equal to $3.76 \times 10^3$ m/sec.

It is assumed that the illustrated acoustooptic device is included in a laser oscillator having a pair of mirrors which are distant from each other and which is operable as a laser resonator. The distance between the mirrors becomes short with an increase of the separation angle $\theta$. This results in a in size of the laser oscillator.

Under the circumstances, the Bragg diffraction angle $\theta$ of the illustrated acoustooptic device was equal to 6.76 mrad, when the wavelength λ and the frequency f were equal to 1.06 μm and 24 MHz, respectively.

In addition, temperature characteristics were compared between the conventional acoustooptic device illustrated in FIG. 1 and the acoustooptic device illustrated in FIG. 3. For this purpose, pure water was circulated through the heat sink 23 (FIG. 1) and through the first internal space 46 (FIG. 3) at a flow rate of 0.5 liter/minute while an electric signal of 50 watts was supplied to the transducer 22 (FIG. 1) and 36 (FIG. 3).

Figure 11:
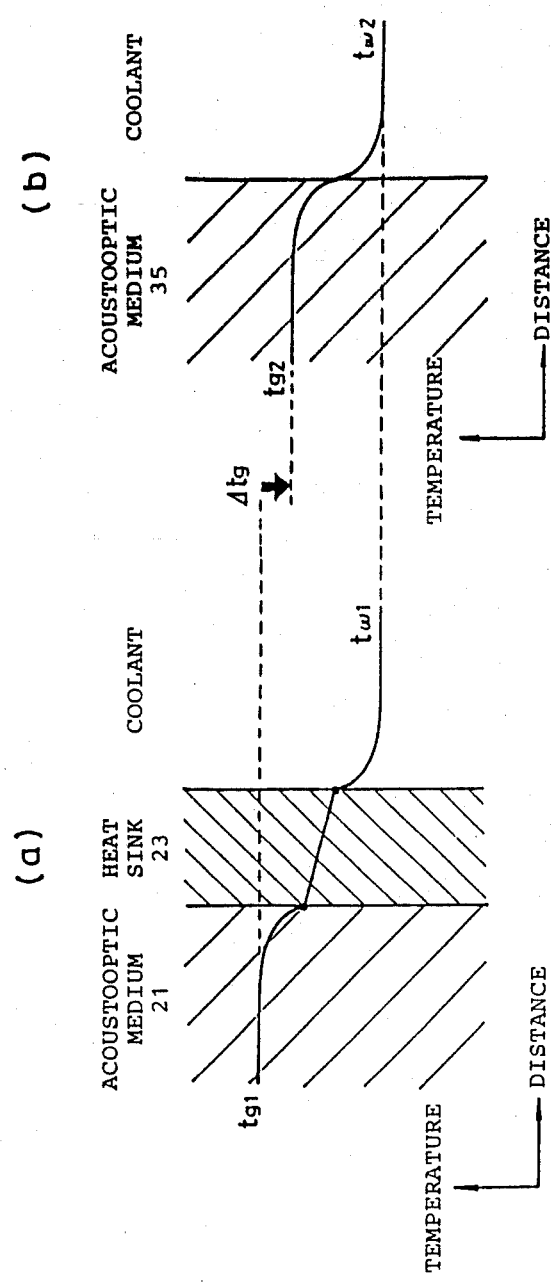
FIGS. 11(a) and 11(b) are views for use in comparing a temperature characteristic of the conventional acoustooptic device with that of the acoustooptic device according to this invention.

Referring to FIG. 11(a), the acoustooptic medium 21, the heat sink 23, and the coolant are arranged along the abscissa of FIG. 11(a) to specify the conventional acoustooptic device. With this structure, the acoustooptic medium 21 is cooled by the coolant through the heat sink 23 and is therefore indirectly cooled. In this event, the temperature of the acoustooptic medium 21 was heated to $t_{g1}$ in spite of the fact that the temperature of the coolant was kept at $t_{w1}$.

Referring to FIG. 11(b), the acoustooptic medium 35 is brought into direct contact with the coolant to cool the acoustooptic device according to this invention. The temperature of the coolant was kept at the temperature $t_{w2}$ equal to $t_{w1}$. In this case, the temperature of the acoustooptic medium 35 was kept at a temperature $t_{g2}$ which was reduced by $t_g$ of was 20° or so. Thus, the acoustooptic device according to this invention is excellent in temperature characteristic as compared with the conventional acoustooptic device. This is based on the fact that heat radiation is performed from overall surfaces of the acoustooptic medium 35 in the acoustooptic device according to this invention while heat radiation is restricted in the conventional acoustooptic device to a local surface adjacent to the cooling path 24.

Consequently, an internal thermal condition is well balanced in the acoustooptic medium 35 (FIG. 3) of this invention. It is therefore possible to avoid breakage or cracks of the acoustooptic medium 35 and to suppress optical distortion. This means that electric power can be increased and, as a result, diffraction efficiency can be improved.

As shown in FIG. 3, the acoustooptic device can be assembled by only three main components or parts, namely the case block 40 and the first and the second cap members 41 and 42. Moreover, the first and the second cap members 41 and 42 may have the same structure and can be used interchangeably. Therefore, it is possible to improve the operation efficiency of machining and assembling the parts. This effects improvement of economy in of acoustooptic device in addition to miniaturization of the device resulting from a high diffraction efficiency.

While this invention has thus far been described in conjunction with a preferred embodiment thereof, it will readily be possible for those skilled in the art to put this invention into practice in various other ways. For example, the partition or bulkhead 48 may be removed from the case block 40 to unite the first and the second internal spaces 46 and 47 into a single space. In this event, the coaxial connector 55 and the lead conductors 53 may be covered with the seal material, such as silicone resin so as to avoid erosion and disconnection. Ethylene glycol may be substituted for water as the coolant. Any other nonconductive or conductive liquids may be used as the coolant. However, it is noted that at least the electrode member of the transducer 35 and the lead conductors 53 must be covered with a nonconductive seal material when the conductive liquid circulates through the space.

What is claimed is:

1. An acoustooptic device comprising:
    an acoustooptic element which comprises a solid body of an acoustooptic medium and a transducer, said acoustooptic medium having first and second surfaces opposite each other to receive and emit a laser beam, respectively, and a side surface contiguous to said first and said second surfaces, said transducer being attached to said side surface to transduce an electric signal into an acoustic signal;
    a housing defining an internal space therein and a pair of windows opposite each other for hermetically housing said acoustooptic element in said internal space with a part of said internal space left unoccupied by said acoustooptic element with said first and said second surfaces partially illuminable by said laser beam through said window;
    an inlet portion attached to said housing for introducing a coolant into said part of the internal space to bring said coolant into direct contact with said acoustooptic medium; and
    an outlet portion attached to said housing for discharging said coolant from said part of the internal space.

2. An acoustooptic device as claimed in claim 1, wherein said housing comprises:
    a case block having front and back ends opposite to each other and an internal wall surface which is contiguous to said front and said back ends and which defines said internal space;
    first and second cap members for covering said internal space on said front and said back ends with said windows formed in said first and said second cap members; and
    a pair of seal members between said front end and said second cap member and between said back end and said first cap member for hermetically sealing said acoustooptic element in said internal space.

3. An acoustooptic device as claimed in claim 2, wherein each of said first and said second cap members has an inside surface directed to said internal space, an outside surface opposite to said inside surface, and a cap internal surface for defining a selected one of said windows.

4. An acoustooptic device as claimed in claim 3, wherein said each cap member comprises:
    a recessed portion depressed relative to said inside surface and associated with said selected one of the windows for supporting said acoustooptic element;
    a first receiving portion surrounding said selected one of the windows for defining a first groove formed around said selected one of the windows within said recessed portion; and
    a second receiving portion surrounding said recessed portion on said inside surface of said each cap member for defining a second groove;
    each of said seal members comprising:
    a first O-ring fitted to said first groove; and
    a second O-ring fitted to said second groove.

5. An acoustooptic device as claimed in claim 4, wherein said first cap member has the same structure as said second cap member.

6. An acoustooptic device as claimed in claim 1, wherein said internal space is partitioned into first and second internal spaces with a bulkhead left therebetween and with an aperture formed through said bulkhead;
    said acoustooptic element being accommodated in said first internal space and having lead conductors derived from said transducer through said aperture to said second internal space;
    said acoustooptic element further comprising:
    a nonconductive seal material which is coated on said lead conductors and said transducers and which is embedded in said aperture to hermetically seal said second internal space from said first internal space.

7. An acoustooptic device as claimed in claim 6, further comprising:
    an impedance matching circuit connected to said lead conductors in said second internal space; and
    an electrical connector electrically connected to said impedance matching circuit.

8. An acoustooptic device as claimed in claim 1 wherein said inlet and said outlet portions are positioned to establish a circulating path for said coolant in said housing around said acoustooptic medium.

9. An acoustooptic device as claimed in claim 8 wherein said coolant is a liquid.

10. An acoustooptic device as claimed in claim 1 comprising means sealing said housing and said acoustooptic medium at said windows for preventing flow of coolant thereat.

11. An acoustooptic device as claimed in claim 10 wherein said inlet and said outlet portions are positioned to establish a circulating path for said coolant in said housing around said acoustooptic medium in isolation from said windows.

* * * * *